Oct. 25, 1960 E. G. HILL 2,957,728
BOOSTER BRAKE MECHANISM
Filed Sept. 7, 1955 3 Sheets-Sheet 2

INVENTOR.
EDWARD GOVAN HILL
BY
John F. Phillips
ATTORNEY

Oct. 25, 1960
E. G. HILL
2,957,728
BOOSTER BRAKE MECHANISM
Filed Sept. 7, 1955
3 Sheets-Sheet 3
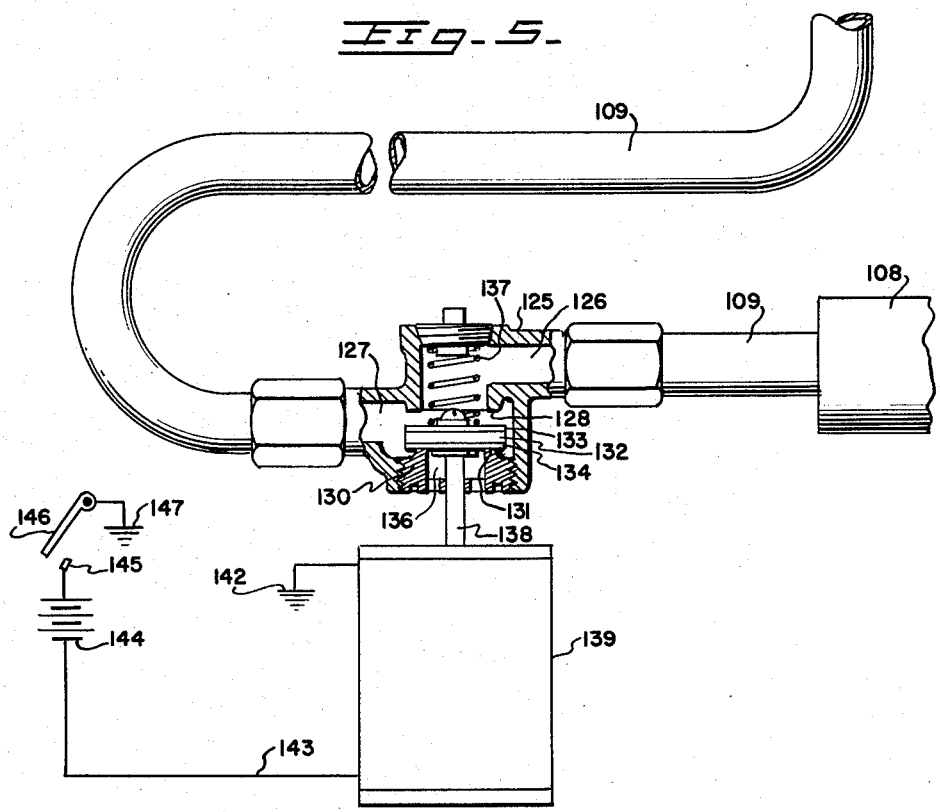
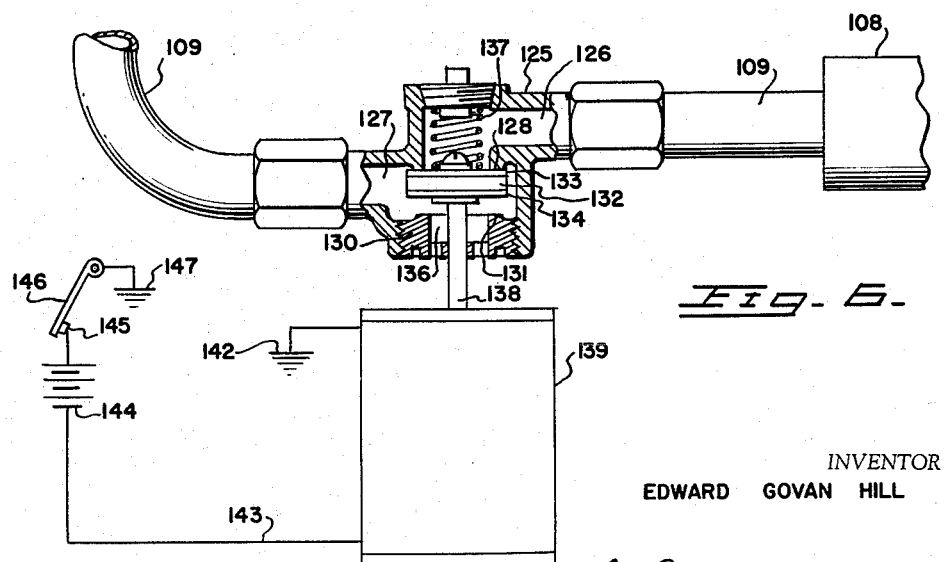
INVENTOR
EDWARD GOVAN HILL
BY John H. Phillips
ATTORNEY United States Patent Office 2,957,728
Patented Oct. 25, 1960

2,957,728

BOOSTER BRAKE MECHANISM

Edward Govan Hill, Birmingham, Mich., assignor to Kelsey-Hayes Company, a corporation of Delaware Filed Sept. 7, 1955, Ser. No. 532,906

6 Claims. (Cl. 303—6)

This invention relates to a booster brake mechanism and is an improvement over the structures shown in my copending applications Serial No. 514,020, filed June 8, 1955, now Patent No. 2,876,044, granted March 3, 1959, and Serial No. 523,309, filed July 20, 1955, now abandoned in favor of continuation-in-part application Serial No. 827,193.

In my copending applications referred to I have shown novel booster brake mechanisms wherein a double-ended motor having separate pistons therein, or separate motors each having a piston therein, are energized to separately operate a pair of fluid displacing plungers to displace fluid respectively into the front wheel and rear wheel brake cylinders of a motor vehicle. With the structures shown in the copending applications, generation of rear wheel braking forces is limited to the maximum energization of the motor associated with the fluid chamber connected to the rear wheels. The front wheel brakes are subject to the generation of hydraulic forces which are the sum of the pedal pressure developed by the operator and the force developed by the other motor piston. Therefore, much greater brake applications are possible at the front wheels than at the rear wheels of the vehicle.

The system in each of the copending applications referred to employs a brake pedal responsive valve mechanism which functions when the pedal is depressed to simultaneously admit relatively high pressure into both motors to tend to simultaneously and equally energize the two motors, assuming that the motors are of the same size. Each system, moreover, employs an inertia-controlled valve, operable independently of the main control valve mechanism for limiting the admission of pressure into the motor for the rear wheel cylinders in the event the operator makes a so-called "panic" stop. Without the inertia-controlled valve, the full energization of the rear wheel booster motor could result in the locking of the rear wheels, which is disadvantageous. With the inertia-controlled valve, therefore, the generation of hydraulic forces in the rear wheel cylinders is limited to a point below that at which the rear wheels will be locked, thus maintaining the traction of such wheels with the road surface.

The foregoing does not affect the front wheel booster motor and the latter will be fully energized and, assisted by pedal generated pressures, will apply very great braking forces to the front wheels. In practice it has been found that such a system provides a vehicle deceleration rate above any point heretofore attained.

In the normal operation of each apparatus of the character referred to, therefore, it is possible to secure much better and more efficient braking results with brake systems wherein 60% of the braking effect occurs at the front wheels and 40% at the rear wheels. Moreover, with a vacuum motor of the type disclosed in the copending applications, the use of a check valve in the line between the valve mechanism and the source of vacuum will maintain in the vacuum motors vacuum to a sufficiently high degree to permit the operator to accomplish two or three vehicle stops even in the event of a failure of power. Moreover, since separate hydraulic lines lead from the two hydraulic pressure reducing devices to the front and rear wheel cylinders, a break in the hydraulic line to the rear wheel cylinders still permits the operator to secure full braking efforts at the front wheels. Still further, in the absence of power for operating the booster motors, the operator can generate sufficient pedal pressure for applying the front wheel brakes to effect a fairly rapid vehicle deceleration to stop the vehicle. This leaves two possible conditions in which no braking action can be effected, namely, the breaking of the hydraulic line from the master cylinder to the booster mechanism, and the breaking of the hydraulic line from the booster mechanism to the front wheel cylinders. Under such conditions, there will be no foot-generated hydraulic pressures to effect operation of the control valve mechanism to energize the booster motors.

The principal object of the present invention is to provide novel means in combination with a system of the character referred to wherein breaking of either hydraulic line from the master cylinder to the booster mechanism or from the booster mechanism to the front wheel cylinders permits the operator to cause energization of the rear brake motor to apply the rear wheel brakes, thus providing for the stopping of the vehicle under the emergency conditions referred to.

More specifically, an object of the invention is to provide means operable under the emergency conditions particularly referred to for supplying air to the variable pressure chamber of the rear wheel booster motor to actuate the latter and generate braking pressures in the rear wheel cylinders.

A further object is to provide such a mechanism wherein the auxiliary means for supplying air to the rear wheel booster motor is not subject to control in the normal operation of the mechanism, the auxiliary motor energizing means normally being inoperative and becoming operative only upon a hydraulic fluid line failure of the character referred to.

A further object is to provide such a mechanism wherein a control device for admitting air into the booster motor for the rear wheels is operative by the foot pedal at a point beyond the normal stroke of the pedal, whereby the auxiliary means will not be operated under normal conditions, but only when a break of the character referred to in one of the hydraulic lines permits the pedal to move beyond its normal limit of movement.

Other objects and advantages of the invention will become apparent during the course of the following description.

In the drawings I have shown one embodiment of the invention. In this showing:

Figure 4 is a fragmentary detail section on line 4—4 of Figure 1;

Figure 5 is an enlarged side elevation of the auxiliary control mechanism forming the principal subject matter of the present invention, the valve device itself being broken away and shown in section with the valve in its normal position; and Figure 6 is a similar view showing the valve in its operative position.

As in my copending applications referred to, a single booster motor has been shown having separate pistons and separate variable pressure chambers for actuating the fluid displacing plungers respectively for the front and rear wheel cylinders. It will become obvious that the motors need not be included in a single unit but may be wholly separate and distinct from each other except for the controls connected thereto.

Figure 1:
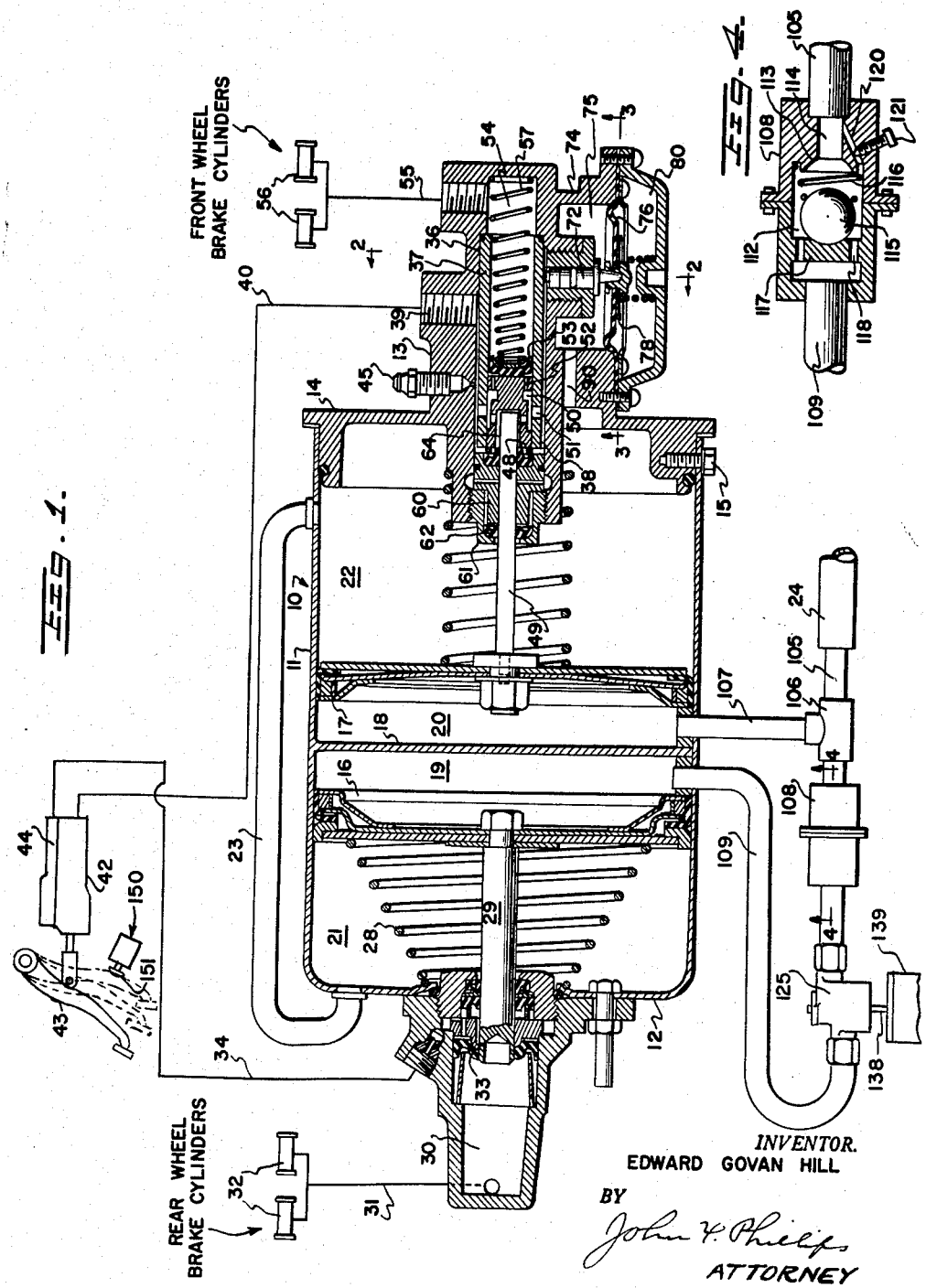
Figure 1 is an axial sectional view through the booster mechanims, parts being diagrammatically shown and the electric wiring being omitted to avoid confusion with the diagrammatically shown fluid lines.

The single booster motor is indicated by the numeral 10 in Figure 1 and comprises a cylinder 11 one end of which is closed by a preferably integral head 12. At the other end of the motor is provided a die-cast body 13, having a circular portion 14 integral therewith and forming a head for the adjacent end of the motor cylinder, such head being connected in position by screws 15.

Within the cylinder 11 is a pair of pressure responsive units 16 and 17, shown in the present instance as being pistons. Between these pistons is arranged a dividing wall 18 forming with the pistons a pair of variable pressure chambers 19 and 20. The piston 16 forms with the head 12 a constant pressure chamber 21, and a similar chamber 22 is formed between the piston 17 and head 14. A jumper line 23 is connected at opposite ends with the motor chambers 21 and 22, thus equalizing pressures in such chambers at all times.

A valve mechanism to be described controls pressures in the chambers 19 and 20 through the medium of a conduit 24 separately connected to the chambers 19 and 20 as described below. Normally, all of the chambers 19, 20, 21 and 22 are connected to a vacuum source. Thus the motors will be vacuum-suspended and the parts will occupy the positions shown in Figure 1. The admission of air into the chambers 19 and 20, as described below, will cause the pistons 16 and 17 to be moved away from each other, as will be apparent.

A return spring 28 biases the piston 16 to its off position, and this piston carries a fluid displacing plunger 29 movable into a hydraulic chamber 30 to displace fluid therefrom through lines 31 solely to the rear brake cylinders 32 of the vehicle. The plunger 29 operates in a suitable bearing and sealing means indicated by the numeral 33 and forming per se no part of the present invention. The bearing and sealing means is of such nature as to provide for the admission of replenishing fluid into the chamber 30 through a line 34, further described below.

A bore 36 is formed in the body 13, and in this bore is arranged a sleeve 37 surrounded between its ends by an annular space 38 having a hydraulic fluid inlet 39 connected to a hydraulic line 40. A conventional master cylinder 42 is provided with an operating pedal 43 for actuating the usual master cylinder piston (not shown) for displacing fluid through the line 40. The master cylinder 42 also includes the conventional reservoir 44 connected to the line 34, referred to above. A bleed plug 45 is threaded in the body 13 for assisting in bleeding air from the system when the apparatus is installed.

The sleeve 37 forms a cylinder in which is slidable a fluid displacing plunger 48 adapted to be actuated by a piston rod 49 connected to the piston 17. A space 50 around the plunger 48 communicates with the annular space 38 through ports 51, and accordingly the space 50 is supplied with fluid from the master cylinder 42 when the pedal 43 is operated. This fluid can flow through ports 52 into the end of the plunger 48, thence around the lip of a cup 53, seated against the plunger 48, and thus into the hydraulic chamber 54. This chamber communicates through lines 55 solely with the front wheel brake cylinders 56. The plunger 48 is biased to its normal off position in Figure 1 by a spring 57.

The piston rod 49 extends through a bearing 60 mounted in the cast body 13 and retained in position by a nut 61 having fluid-sealed relation, as at 62, with the bearing 60 and piston rod 49. The plunger 48 is provided with an axial recess 64 into which extends the right-hand end of the plunger 49, as viewed in Figure 1. This recess is open to communication with the space 50 whereby fluid pressure in the recess 64, generated by the pedal 43, assists the motor piston 17 in moving the plunger 38 to displace fluid from the chamber 54. The functioning of the plunger 48 and associated parts referred to above forms per se no part of the present invention but is described and claimed in the copending application of David T. Ayers, Jr., Serial No. 455,509, filed September 13, 1954, now Patent No. 2,852,921, granted September 23, 1958.

Figure 2:
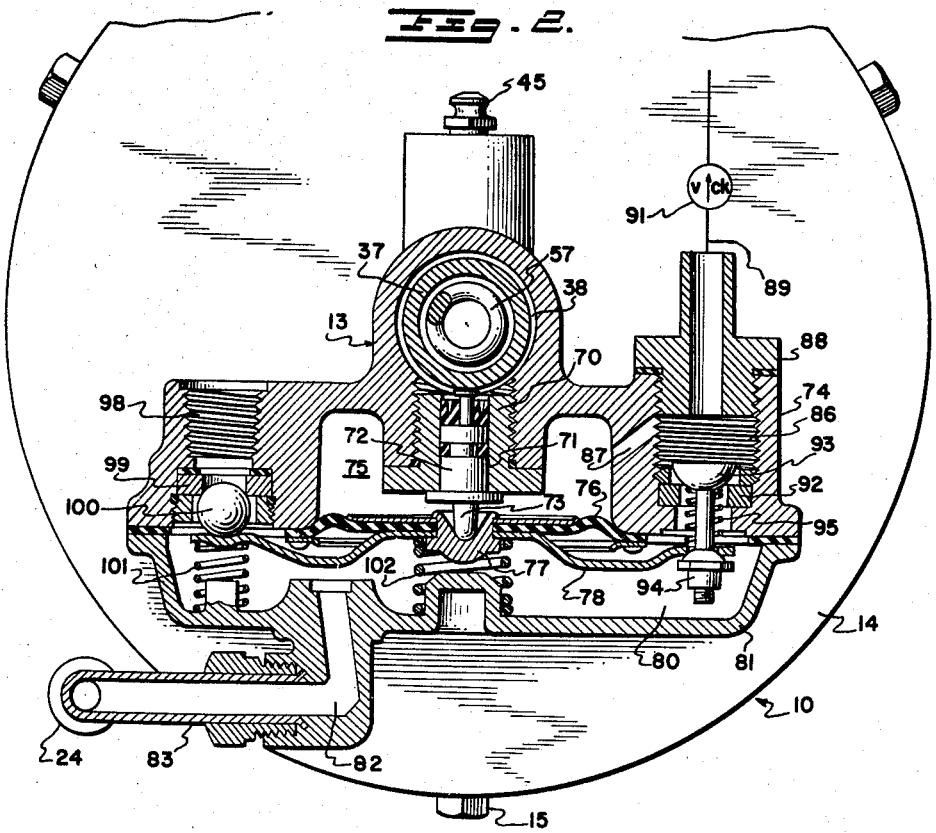
Figure 2 is an enlarged transverse sectional view on line 2—2 of Figure 1.
Figure 3:
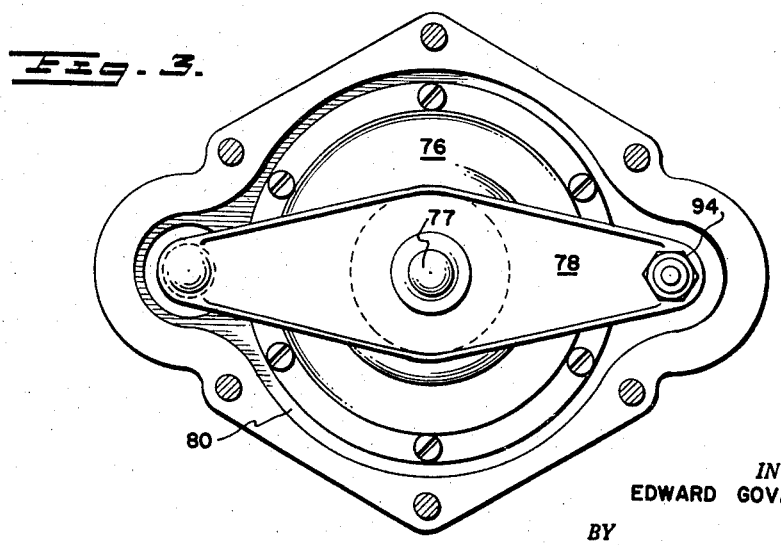
Figure 3 is a section on line 3—3 of Figure 1.

The valve mechanism for controlling the motor forms no part per se of the present invention but is described and claimed in the copending application of Jeannot G. Ingres, Serial No. 455,647, filed September 13, 1954, now Patent No. 2,905,151, granted Sept. 22, 1959. It will become apparent that the present invention is not limited to the use of any particular type of motor control valve mechanism. Referring to Figure 2, the numeral 70 designates a nut threaded into the body 13 and forming therein a cylinder 71 in which is slidable a sealed pressure operable plunger 72. The upper end of the cylinder 71 communicates with the space 38, which is elongated at one side of the sleeve 37 for this purpose as shown in Figure 1. Accordingly, the plunger 72 is displaced by fluid forced from the master cylinder into the chamber 38 and into the upper end of the cylinder 71. An operating boss 73 is carried by the lower end of the plunger 72 (Figure 2).

An annular, preferably integral depending portion 74 is formed on the body 13 and has therein a vacuum chamber 75 sealed at the bottom thereof by a diaphragm 76. This diaphragm is carried by a thimble 77 axially recessed in the top thereof to receive the boss 73. The thimble 77 is also secured to a lever 78 intermediate the length thereof.

A control chamber 80 is formed within a cap 81 secured against the bottom of the body portion 74. The lever 78 is arranged in the control chamber 80 and the latter communicates through a passage 82 and elbow 83 with the conduit 24 previously described.

Radially outwardly of the chamber 75, the body 13 is provided therein with a vacuum chamber 86 communicating through a passage 87 with the chamber 75. A suitable fitting 88 is threaded into the upper end of the chamber 86 for connection with a vacuum line 89 in which is arranged a check valve 91 opening to the source of vacuum such as the intake manifold of the motor vehicle engine. It will be apparent that in the normal operation of the apparatus, vacuum is always present in the chamber 75, and this chamber is in fixed communication through a passage 90 (Figure 1) with the motor chamber 22. This chamber, in turn, is in fixed communication with the motor chamber 21 through the jumper line 23, and accordingly constant vacuum will be maintained in the chambers 21 and 22.

A valve seat 92 is maintained at the bottom of the vacuum chamber 86 and is engageable by a hemispherical valve 93 at the lower end of the stem of which is arranged an adjusting nut 94 engaging against the bottom of one end of the lever 78. A spring 95 maintains the valve 93 at its upper limit of movement with the hemispherical upper head of the nut 74 engaging the lever 78. The valve 93 is normally open as in Figure 2, and therefore the chambers 80 and 86 communicate with each other and air will be exhausted through the line 24 to maintain vacuum in the motor chambers 19 and 20 to vacuum-suspend the motor units, as will become more apparent below.

An air inlet chamber 98 is formed in the body 13 diametrically opposite the chamber 86 and is tapped for connection with a suitable air cleaner (not shown). An air valve seat 99 is arranged in the bottom of the air inlet 98 and is normally engaged by a ball valve 100 which seats upwardly, as will be obvious in Figure 2. The ball valve 100 engages the top face of the adjacent end of the lever 78, the latter being urged upwardly by a spring 101. Centrally of its length, the lever 78 is urged upwardly by a compression spring 102.

The end of the conduit 24 remote from the valve mechanism is connected to a pipe 105 having a T 106 the branch of which is connected by a pipe 107 to the motor chamber 20. The run of the T 106 communicates with one end of a valve housing 108 and the other end of this housing normally is in full communication with the motor chamber 19 through a pipe 109. Such normal communication, however, is subject to control by an auxiliary valve device referred to below.

The mechanism in the valve housing 108 is subject to inertia control for a purpose to be described and, as shown in Figure 4, the inertia valve device corresponds to the showing in my Patent No. 2,876,044, referred to above. The valve for controlling communication between the pipes 105 and 109, however, may be of the type shown in my copending application Serial No. 827,193, also referred to above. In the latter application, the valve device corresponding to the valve device in the housing 108 is a solenoid operated valve controlled by an inertia operated switch, more specifically a mercury switch. It will be noted, therefore, that the present invention is not limited to the use of any particular type of an inertia-controlled valve.

The valve device in Figure 4 is provided within the housing 108 with a chamber 112 at one end of which is formed a valve seat 113. Between this seat and the pipe 105 is an axial passage 114. A valve 115 in the chamber 112 is engageable under conditions to be described with the seat 113 and is urged to open position by a spring 116.

A wall 117 at one end of the chamber 112 forms a stop member for the valve 115 and is aperatured as at 118 for substantially unrestricted communication between the chamber 12 and pipe 109. As viewed in Figure 1, the right-hand end of the mechanism represents the forward end of the vehicle and the left-hand end the rear of the vehicle, this being important in connection with the functioning of the valve 115 or any other type of inertia-controlled valve.

The valve housing 108 is provided with a bypass passage 120 communicating at opposite ends with the chamber 112 and passage 114 and may be controlled by an adjustable valve 121 to provide any desired degree of restriction of the passage 120 or to close this passage entirely, depending upon the desired mode of operation of the brake mechanism. Ordinarily, the passage 120 is closed and it may be eliminated completely.

The device forming the principal subject matter of the present invention is diagrammatically shown in Figure 1 and is shown more in detail in Figures 5 and 6 together with a diagrammatic showing of electric circuit means, if the form of auxiliary control valve shown in Figures 5 and 6 is employed. Referring to Figures 5 and 6, the numeral 125 designates a valve housing having an upper chamber 126 and a lower chamber 127 normally in fixed communication with each other through a valve seat 128. Therefore, there is normally unrestricted communication through the pipe 109, and as described below, this communication between chambers 126 and 127 will never be cut off except through a rupturing of either of the hydraulic lines 40 or 55 (Figure 1).

In the bottom of the housing 125 is threaded a valve seat member 130 having a valve seat 131 at its upper end. Between the seats 128 and 131 is arranged a valve disk 132 having an upper resilient valve member 133 and a lower similar member 134. The valve 133 normally occupies the position shown in Figure 5, while the lower valve 134 normally engages the seat 131, thus normally cutting off communication between the interior of the valve housing 125 and the atmosphere. When the auxiliary control valve is moved to the position shown in Figure 6, communication between the interior of the valve housing 125 and the atmosphere is established through a passage 136 within the member 130.

The valve disk 132 is urged downwardly by a spring 137 and is movable upwardly in a manner to be described by actuating a stem 138 forming a part of the armature of a solenoid 139. This solenoid is normally de-energized.

One side of the solenoid 139 is grounded as at 142. The other side of the solenoid is connected by a wire 143 to one terminal of the vehicle battery 144. The other terminal of this battery is connected to a contact 145 engageable by a switch arm 146 as diagrammatically shown in Figures 5 and 6, this switch arm being grounded as at 147. The switch arm 146 forms part of a switch indicated as a whole in Figure 1 by the numeral 150 and provided with a push button 151 for operating the switch arm. The button 151 is arranged close to the bottom of the vehicle toe board and beyond the normal path of travel of the adjacent portion of the brake pedal 43. Assuming that the system is in perfect operating condition, with the brakes of the vehicle properly adjusted, the brake pedal 43 cannot be pushed downwardly and forwardly far enough to engage the button 151 and operate the switch 150. This operation occurs only through complete loss of pressure in the master cylinder 44 incident to the rupturing of either of the fluid lines 40 or 55.

*Operation*

The parts normally occupy the positions shown in Figures 1 and 2, the pedal 43 being in the solid-line position in Figure 1. The brakes are applied by depressing the pedal 43 to displace hydraulic fluid through line 40 and annular space 38 into the sleeve 37 through ports 51, and thence past the sealing cup 53 into the chamber 54. Fluid thus flows through lines 55 to the front wheel cylinders 56. When the hydraulic pressure reaches a predetermined point in the space 38, the plunger 72 (Figures 1 and 2) will be actuated to impart movement to the central portion of the lever 78 through thimble 77, as will be clearly apparent in Figure 2. The spring 101 initially maintains the valve 100 seated, and force applied to the center of the lever 78 operates against the compression of the spring 102 to pull the vacuum valve 93 to closed position. Upon the seating of the valve 93, further movement of the thimble 77 compresses the spring 101 and permits the ball 100 to drop away from its seat 99. The chamber 80 will then be disconnected from the vacuum source and connected to the atmosphere, and air will flow through passage 82, conduit 24 and through the various pipes and connections illustrated, into the motor chambers 19 and 20. For normal brake operations at reasonable vehicle speeds, the valve 115 (Figure 4) will remain open and identical air pressures will be established in the chambers 19 and 20.

The two motor units thus will be energized to move the pistons 16 and 17 apart. The plunger 29 will displace fluid from the chamber 30 into the rear brake cylinders 32. The piston rod 49 will actuate the plunger 48 to displace fluid from the chamber 54 into the front brake cylinders 56, the force delivered by the piston 17 being assisted by pedal-generated pressure back of the plunger 48.

The braking action may be carried on to any desired extent. It will be apparent, however, that braking forces at the rear wheels will be wholly dependent upon hydraulic pressures generated by the piston 16, and ordinarily the hydraulic pressures so generated are not effective for locking and sliding the rear wheels of the vehicle. The hydraulic forces applied to the brake cylinders for the front wheels of the vehicle, however, will be limited only by the force which the operator can apply to the brake pedal. Such front brake cylinder pressures will be the sum of the forces generated by the piston 17 and by the master cylinder piston. Thus, much greater braking efforts may be applied to the front wheels of the vehicle than the rear wheels, and this provides for a highly efficient brake operation since, while 60% of the braking effort is applied to the front wheels, the forward end of the vehicle bears the very substantial weight of the vehicle engine and associated parts.

Assuming that the operator makes a so-called "panic" stop, he will exert sudden and substantial pressures against the pedal 43, in which case the foregoing operations will take place except for the functioning of the valve shown in Figure 4. Under such conditions, the vehicle will decelerate at a rate greater than the normal deceleration rate and the valve 115, through its own inertia, will move forwardly or to the right in Figure 4 to engage the seat 113. The pressure of the engagement of the valve 115 with the seat 113 will prevent the flow of air rearwardly through passage 114, and the maximum pressure developed in the motor chamber 19 will be substantially below atmospheric pressure. This is highly desirable in order to prevent the generation of rear braking pressures sufficient to lock and slide the rear wheels. Accordingly, traction of the rear wheels is maintained, and the braking effort at the rear of the vehicle is more effective than would be true if higher rear braking pressures were developed so as to lock and slide the wheels. At the same time, the operator, within the limits of his strength, may apply any desired hydraulic pressures to the front brake cylinders. The front motor unit including the piston 17 will be fully energized, not being affected by the inertia valve.

The means for supplying fluid from the master cylinder 42 into chamber 54 and thus to the front brake cylinders forms per se no part of the present invention but is disclosed and claimed in Patent No. 2,852,921, referred to above.

The returning of the parts to normal position takes place in a manner which will be obvious from my copending applications referred to above. The releasing of the pedal 43 releases the valve operating plunger 72 for return movement to normal position, the spring 101 effecting the seating of the air valve 100 and the spring 95 opening the vacuum valve 93. Vacuum will be reestablished in chambers 19 and 20 to vacuum-suspend the motor units. The return springs for the pistons will return these elements to their normal positions and the spring 57 will return the plunger 48 to its normal position shown in Figure 1.

With the mechanism as thus far described it will be apparent that once vacuum has been established in the booster system, it will be maintained by the check valve 91 (Figure 2). Thereafter, in the event of a failure in the source of power, for example if the motor vehicle engine stalls, the valve mechanism is still subject to operation to admit air into the chambers 19 and 20 and the vehicle can be brought to a stop. As a matter of fact, two or three braking actions may take place after the power source has failed. Even if no vacuum is available in the motor, for example if the motor vehicle initially is permitted to roll downhill away from a curb before the engine is started, the operator can still depress the brake pedal 43 and will build up pedal generated braking forces in the front brake cylinders 56.

Thus the system provides for at least sufficient braking of the vehicle under all conditions except if a break should occur in either of the fluid lines 40 or 55. Assuming that such an emergency should occur, the depressing of the brake pedal can neither force fluid to the front brake cylinders 56 nor effect energization of the motor, since the operator cannot generate the pressure necessary to operate the plunger 72. The present invention takes care of such an emergency. The normal path of travel of the brake pedal 43 is limited to a point where the pedal will not contact the button 151, for example the dotted-line position in Figure 1. If either hydraulic line 40 or 55 should break, however, the pedal 43 can move beyond its normal path, as shown, for example, in dot-and-dash lines in Figure 1, since it will be generating no pressure. Under such conditions, the brake pedal will push the button 151 (Figure 1) to operate the switch 150.

Referring to Figure 5, it will be noted that since the push button 151 is beyond the normal path of travel of the pedal 43, the switch arm 146 will remain in open position and the valve 134 will remain in engagement with the seat 131, biased to such position by the spring 137. However, if either of the fluid lines referred to should be ruptured, the switch arm 146 will be closed, in which case the solenoid 139 will be energized. This will effect upward movement of the stem 138 as viewed in Figures 5 and 6. The valve 134 will be opened and the valve 133 closed, whereupon the chamber 127 will be connected to the atmosphere through passage 136 and air will flow through pipe 109 into the motor chamber 19. Thus the rear motor unit will be energized and the rear brakes will be applied to stop the vehicle.

The system would be operative without closing the chamber 126 to the atmosphere under the emergency conditions referred to and as shown in Figure 6. If the chamber 126 is opened to the atmosphere, however, air will flow into both motor chambers 19 and 20 to effect movement of both pistons 16 and 17. Since pressures cannot be built up in the fluid lines to the front wheel brake cylinders, however, the piston 17 would perform no function and its operation merely would provide a time lag between the full opening of the valve 134 and the full application of the rear brakes. Therefore, it is preferred that the chamber 126 be disconnected from the chamber 127 and closed to the atmosphere under the emergency conditions referred to, and under such conditions, a maximum application of the rear brakes will occur.

While the rupturing of either of the lines 40 or 55 is very unlikely to occur, the present mechanism will take care of such a condition if it arises. Without the present mechanism, if either fluid line 40 or 55 should break, there would be no braking forces available to stop the vehicle. The present invention thus cooperates with the mechanism as a whole whereby the latter provides sufficient brake applications under all emergency conditions to permit the operator to bring the vehicle to a stop.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism for a motor vehicle having a pair of sets of wheel cylinders, comprising a pair of hydraulic chambers, separate hydraulic lines respectively connecting said hydraulic chambers to said sets of wheel cylinders, a first and a second booster motor each having a pressure responsive unit dividing it to form a constant pressure chamber and a variable pressure chamber, a plunger projecting into each hydraulic chamber and connected to one of said pressure responsive units, a single control valve means having a pair of ducts connected to the respective variable pressure chambers and normally connecting both ducts to a source of low pressure, and being operative for disconnecting said ducts from said source of low pressure and connecting them to a source of high pressure, operating means comprising a brake pedal and force transmitting connections between said pedal and said control valve means and one of said plungers for controlling said control valve means and for applying pedal forces to said one plunger, said brake pedal having a normal off position and being limited in its movement from such position to a brake applied position by resistance occurring incident to application of brake applying pressures to said one plunger, an auxiliary valve in one of said ducts normally opening communication therethrough, and means connected to said brake pedal and connected to operate said auxiliary valve to close communication through such duct and open the associated variable pressure chamber to said source of high pressure when said brake pedal moves beyond said brake applied position.

2. A mechanism according to claim 1 wherein said one plunger divides its hydraulic chamber to form a high pressure space communicating with one set of wheel cylinders and a low pressure space, said operating means comprising a master cylinder communicating with said low pressure space, said one plunger being constructed to provide for the passage of hydraulic fluid from said low pressure space to said high pressure space when pressure in the latter is lower than pressure in the former.

3. A mechanism according to claim 1 wherein said operating means for said valve mechanism comprises a master cylinder, and a fluid line connecting said master cylinder to said valve mechanism, said valve mechanism having a hydraulic pressure responsive operating element subject to pressure in said fluid line.

4. A booster brake mechanism for a motor vehicle having a pair of sets of wheel cylinders, comprising a pair of hydraulic chambers, separate hydraulic lines respectively connecting said hydraulic chambers to said sets of wheel cylinders, a first and a second booster motor each having a pressure responsive unit dividing it to form a constant pressure chamber and a variable pressure chamber, a plunger projecting into each hydraulic chamber and connected to one of said pressure responsive units, a single control valve means having a pair of ducts connected to the respective variable pressure chambers and normally connecting said ducts to a source of vacuum, and being operative for disconnecting said ducts from said source and connecting them to the atmosphere, said constant pressure chambers being connected to said source, operating means comprising a brake pedal and force transmitting connections between said pedal and said control valve means and the one plunger associated with one of said motors for controlling said control valve means, said brake pedal having a normal off position and being limited in its movement from such position to a brake applied position by resistance occurring incident to application of brake applying pressures to said one plunger, an auxiliary valve device in the one duct associated with the other motor, said valve device having a normal position opening communication through said one duct whereby the associated variable pressure chamber is open to communication with said control valve means, and being operable to close communication through said one duct and open the associated variable pressure chamber to the atmosphere, and operating means connected for operation by said brake pedal upon movement thereof beyond brake applied position for operating said auxiliary valve device.

5. A mechanism according to claim 4 wherein said auxiliary valve device comprises a valve body having a pair of valve seats one of which opens through said one duct to said control valve means and the other of which is open to the atmosphere, and a valve element normally engaging said other valve seat to close said one duct to the atmosphere and being movable by said operating means to engage said one seat and open said other seat.

6. A booster brake mechanism for a motor vehicle having a pair of sets of wheel cylinders, comprising a pair of hydraulic chambers, separate hydraulic lines respectively connecting said hydraulic chambers to said sets of wheel cylinders, a first and a second booster motor each having a pressure responsive unit provided at one side thereof with a variable pressure chamber, a plunger projecting into each hydraulic chamber and connected to one of said pressure responsive units, a single control valve means connected to sources of relatively high and low pressures and communicating with said variable pressure chambers and being operative for disconnecting such chambers from said source of low pressure and connecting them to said source of high pressure, there being a duct through which said control valve means communicates with the variable pressure chamber of one motor, a brake pedal, force transmitting means establishing connection between said brake pedal and said valve mechanism for controlling the latter and for establishing connection between said pedal and the plunger associated with the pressure responsive unit of the other motor to assist the latter in operating such plunger, the connection between said brake pedal and said last-mentioned plunger limiting movement of said brake pedal from a normal off position to a brake applied position by resistance occurring incident to the application of brake applying pressures to said last-mentioned plunger, an auxiliary valve in said duct normally opening communication therethrough, and means connected to said brake pedal and connected to operate said auxiliary valve to close communication through said duct and open the associated variable pressure chamber to said source of high pressure when said brake pedal moves beyond said brake applied position.

References Cited in the file of this patent

UNITED STATES PATENTS

| | | |
|---|---|---|
| 2,373,272 | Stelzer | Apr. 10, 1945 |
| 2,402,344 | Price | June 18, 1946 |
| 2,429,195 | Price | Oct. 14, 1947 |
| 2,747,697 | Banker | May 29, 1956 |
| 2,852,921 | Ayers | Sept. 23, 1958 |

FOREIGN PATENTS

| | | |
|---|---|---|
| 880,259 | Germany | June 18, 1953 |